(12) United States Patent
Wendorf et al.

(10) Patent No.: US 8,632,902 B2
(45) Date of Patent: Jan. 21, 2014

(54) DEVICE FOR RETAINING A BATTERY

(75) Inventors: Axel Wendorf, Rüsselsheim (DE); Jürgen Vollhardt, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 701 days.

(21) Appl. No.: 12/627,741

(22) Filed: Nov. 30, 2009

(65) Prior Publication Data

US 2011/0045331 A1   Feb. 24, 2011

(30) Foreign Application Priority Data

Nov. 29, 2008  (DE) .......................... 10 2008 059 680

(51) Int. Cl.
   *H01M 2/10*   (2006.01)

(52) U.S. Cl.
   USPC ................................ 429/97; 429/96; 429/100

(58) Field of Classification Search
   None
   See application file for complete search history.

(56) References Cited

U.S. PATENT DOCUMENTS

| | | |
|---|---|---|
| 2,849,074 A | 8/1958 | Key et al. |
| 3,498,400 A | 3/1970 | Hysmith |
| 4,174,014 A * | 11/1979 | Bjorksten .................... 180/68.5 |
| 4,429,025 A * | 1/1984 | Stow ................................ 429/97 |
| 4,754,827 A * | 7/1988 | Hirabayashi ................ 180/68.5 |
| 6,153,331 A | 11/2000 | Brantley et al. |
| 6,431,300 B1 | 8/2002 | Iwase |
| 6,871,829 B2 | 3/2005 | Shannon, Jr. |
| 7,014,002 B2 | 3/2006 | Mizuta |
| 7,331,559 B2 | 2/2008 | Hirayu |

FOREIGN PATENT DOCUMENTS

| | | | |
|---|---|---|---|
| DE | 102009053138 A1 | 5/2011 | |
| EP | 0159106 * | 3/1987 | ............. B60R 16/04 |
| JP | 6107090 A | 4/1994 | |

OTHER PUBLICATIONS

German Patent Office, German Search Report for German Application No. 102008059680.9, Oct. 28, 2009.

* cited by examiner

*Primary Examiner* — Kwang Han
(74) *Attorney, Agent, or Firm* — Ingrassia Fisher & Lorenz, P.C.

(57) ABSTRACT

A device is provided for retaining a battery in a motor vehicle and has a receptacle element for receiving a battery, a bracket element, which at least partially encloses the receptacle element and/or the battery, and a fixing element, which is fastenable on the bracket element, the battery being fixed inside the receptacle element using the fixing element. It is thus possible to provide a device for retaining a battery which offers the greatest possible protection for the battery even in case of an accident.

18 Claims, 4 Drawing Sheets

DEVICE FOR RETAINING A BATTERY

CROSS-REFERENCE TO RELATED APPLICATION

This application claims priority to German Patent Application No. 102008059680.9, filed Nov. 29, 2008, which is incorporated herein by reference in its entirety.

TECHNICAL FIELD

The invention relates to a device for retaining a battery in a motor vehicle.

SUMMARY

A battery situated in a motor vehicle, in particular an automobile battery, is typically situated in the engine compartment or the luggage compartment of a motor vehicle. In order that the battery cannot slip so easily during travel, it is typically fastened in a retaining device for fixing the battery in a specific position using retaining elements. However, the known devices for retaining a battery do not have sufficient fixing of the battery in its position in case of an accident, so that the battery can easily and rapidly slip out of its position in case of an accident, which results in very rapid power supply interruption, so that electrical elements in a vehicle may no longer be operated. In particular, this has the result that doors locked by a central locking system may no longer be opened. The battery can additionally not only lose its position in case of an accident, but rather also can easily be damaged so that a power supply is also no longer provided.

At least one object of the invention therefore comprises providing a device for retaining a battery, which offers the greatest possible protection for the battery even in case of an impact. In addition, other objects, desirable features, and characteristics will become apparent from the subsequent summary and detailed description, and the appended claims, taken in conjunction with the accompanying drawings and this background.

The device according to an embodiment of the invention for retaining a battery in a motor vehicle has a receptacle element for receiving a battery, a bracket element, which at least partially encloses the receptacle element and/or the battery to be retained, and a fixing element, which is fastenable on the bracket element, the battery being fixed inside the receptacle element using the fixing element.

The battery is situated in a receptacle element in the form of a preferably rectangular container, six of the five [sic; five of the six] lateral surfaces of the battery preferably being at least partially enclosed and/or covered by the receptacle element. For secure fixing of the battery in the receptacle element, the receptacle element is enclosed by a bracket element, preferably a U-shaped bracket element, the bracket element having two ends on which a fixing element is fastenable. The bracket element can be attached on the inner or outer side of the receptacle element. In the fixed state, the periphery of the receptacle element and/or the periphery of the battery positioned in the receptacle element are spanned by the bracket element together with the fixing element. The battery is thus securely fixed in the desired position inside the receptacle element, even in case of an accident, the battery being able to be held for at least a specific time in its position, so that the power supply is at least not interrupted as rapidly and electrical elements inside the vehicle, such as central locking of the doors, are still capable of functioning for a longer time. The safety of the vehicle occupants can thus be increased.

According to a preferred embodiment of the invention, the fixing element spans at least one lateral surface of the battery, the fixing element preferably spanning a lateral surface of the battery which is not at least partially covered by the receptacle element. The battery is preferably situated having its lateral surface oriented toward the roadway on the bottom surface of the receptacle element, the lateral surfaces of the receptacle element also at least partially covering the two longitudinal sides and the two transverse sides of the battery. The lateral surface of the battery opposite to the lateral surface oriented toward the roadway, i.e., the lateral surface of the battery facing away from the roadway, is preferably not covered by the receptacle element in the fixed state. This lateral surface is preferably spanned by the fixing element, so that all lateral surfaces of the battery are at least partially covered by one element of the retaining device. The battery is thus fixed on all of its lateral surfaces in the desired position, so that possible slipping of the battery out of its position can be prevented as extensively as possible at least as long as the receptacle element itself is not destroyed by the impact during an accident.

According to a preferred embodiment of the invention, the fixing element at least partially comprises an elastic material, in particular a rubber. The fixing element preferably has a steel element, which is provided with the elastic material, such as a rubber pad, the elastic material being situated on the side of the fixing element on which the fixing element presses against the battery. Because the fixing element is implemented as elastic, the fixing element, which preferably presses directly against one lateral surface of the battery, can compensate for vibrations occurring during the travel of the motor vehicle, so that movements of the battery inside the receptacle element during travel are reduced as much as possible. Occurring tolerances are simultaneously compensated for.

Furthermore, according to a further preferred embodiment of the invention, the fixing element is removably fastened on the bracket element using a screw connection and/or a clamp connection. For example, the preferably oblong strip-shaped fixing element can be fastened at one end using a screw connection on the bracket element and can be fastened at its other end using a clamp connection on the bracket element. For the clamp connection, the fixing element can have a hook on one of its ends, for example, which can be hooked into an opening provided on the bracket element. By using a clamp connection and/or a screw connection, the fixing element can be fastened and detached again easily and rapidly.

In order to achieve additional fixing of the battery in the receptacle element and/or in the retaining device, the bracket element at least partially presses against two lateral surfaces of the battery. The bracket element preferably partially presses against the two lateral surfaces of the battery pointing transversely to the travel direction, so that the battery is additionally clamped between these two lateral surfaces using the bracket element and particularly reliable fixing is thus ensured.

According to a further advantageous embodiment of the invention, a protective plate is provided, the protective plate being situated on a lateral surface of the receptacle element pointing in the travel direction. The protective plate is used for the purpose of absorbing the forces acting on the receptacle element during a frontal impact of the motor vehicle and damping them, so that the battery is damaged as little as possible by the forces acting during a frontal impact. The protective plate preferably comprises a reinforced metal plate and preferably has a ribbed structure, whereby the protective plate is implemented as particularly stable.

According to a preferred embodiment of the invention, the protective plate has a nose-shaped angled area, which at least partially covers the lateral surface of the battery which is spanned by the fixing element. The nose-shaped angled area is preferably situated at a right angle to the longitudinal side of the protective plate. Because, in addition to the fixing element, the nose-shaped angled area of the protective plate covers a lateral surface of the battery, particularly secure fixing of the battery inside the receptacle element is ensured. The protective plate can be used in different positions in the receptacle element depending on the size of the battery. The protective plate is preferably situated directly in front of the battery, which is inserted into the receptacle element.

According to an advantageous embodiment of the invention, the receptacle element is produced from a plastic material. The receptacle element thus has a particularly low weight and therefore hardly increases the total weight of the vehicle. The receptacle element can also be produced from a metal, however, such as aluminum.

According to a further advantageous embodiment of the invention, the bracket element is produced from a metal. The bracket element thus has a particularly high stability, whereby the receptacle element can additionally be supported by the receptacle element in case of an accident. The bracket element can also be produced from a particularly stable plastic material, however.

The embodiments of the invention also relate to a motor vehicle, comprising a device implemented and refined as described above for retaining a battery in a motor vehicle.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
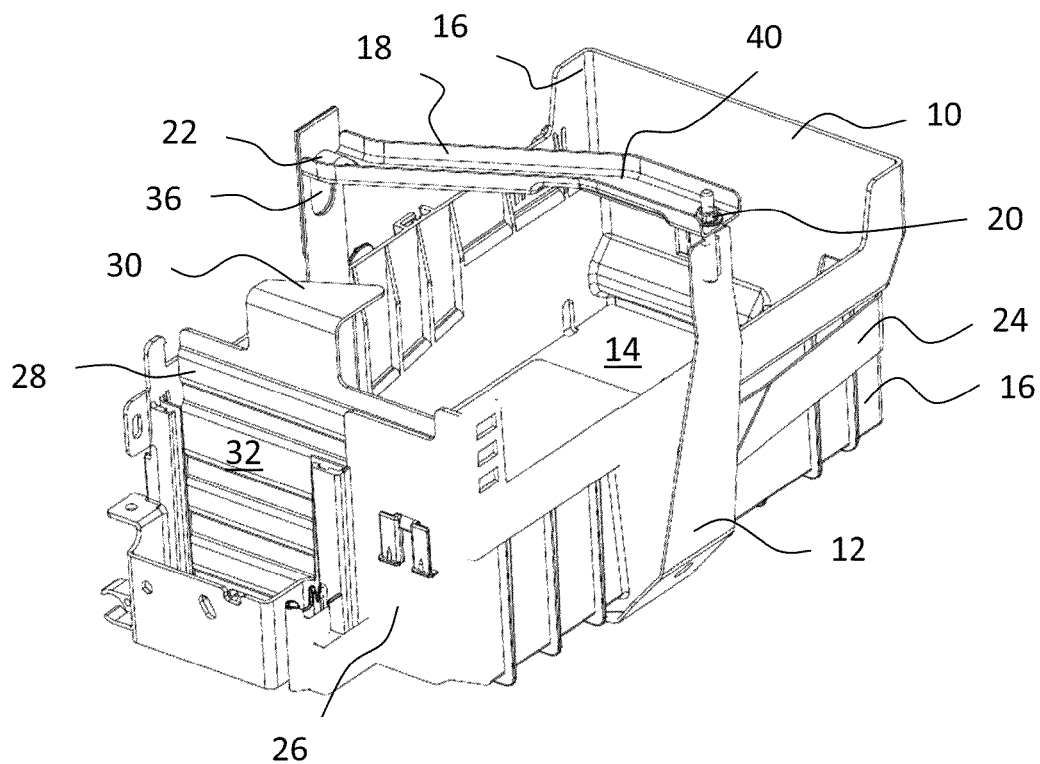
FIG. 1 shows a first perspective schematic illustration of a device according to an embodiment of the invention for retaining a battery in a motor vehicle.

FIG. 1 shows a device according to the invention for retaining a battery in a motor vehicle according to an exemplary embodiment. The device has a receptacle element 10 for receiving a battery (not shown here). The receptacle element 10 is designed as a rectangular container, the battery being inserted into the receptacle element 10 for fixing in a desired position. In the inserted state, the battery is at least partially covered on five of its six lateral surfaces by the receptacle element 10.

Figure 2:
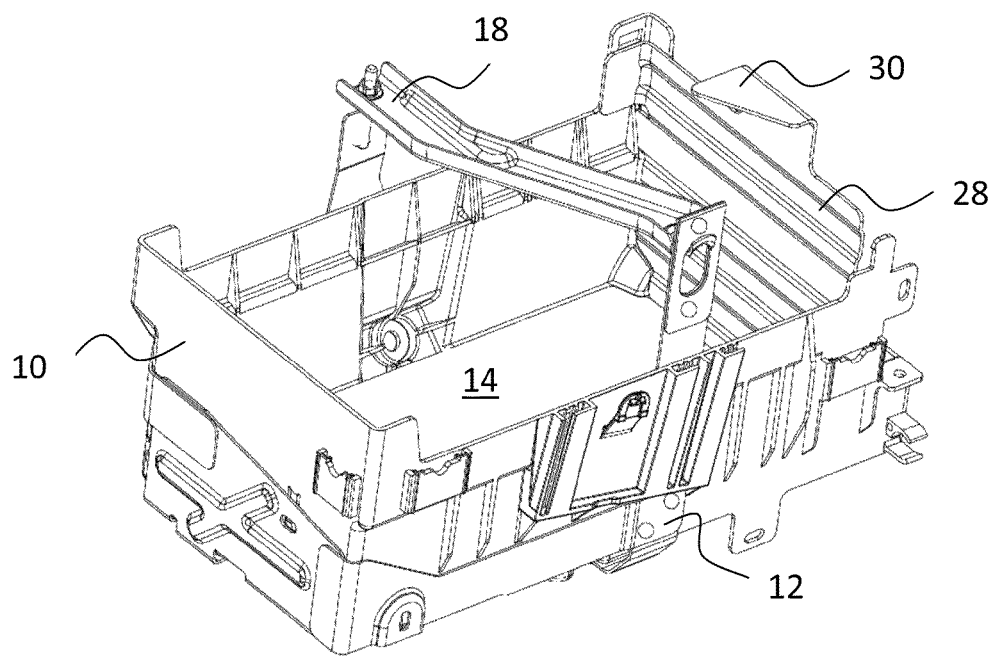
FIG. 2 shows a second perspective schematic illustration of the device according to an embodiment of the invention for retaining a battery in a motor vehicle.

A U-shaped bracket element 12, which encompasses the bottom surface 14 of the receptacle element 10 directed toward the roadway and the longitudinal sides 16 of the receptacle element 10 oriented transversely to the travel direction of the motor vehicle, is situated on the receptacle element 10, in particular on the external surface of the receptacle element 10. A fixing element 18 is situated on the two ends of the bracket element 12, which can be removably fastened on the bracket element 12 using a screw connection 20 and a clamp connection 22. The fixing element 18 spans the lateral surface of the battery which is not at least partially covered by the receptacle element 10. In the clamp connection 22, the fixing element 18 can have a hook 34 on one or both of its ends, which can be hooked in an opening 32 provided on the bracket element 12, as shown in FIG. 2.

The fixing element 18 preferably has a metal plate, made of steel or aluminum, for example, which is provided on at least one side with an elastic material, preferably a rubber, the elastic material preferably being situated in the area of the fixing element 18 which presses against the battery in the installed state. The elastic material of the fixing element 18 is used for the purpose of compensating for the movements of the battery occurring during the travel of the motor vehicle.

Figure 4:
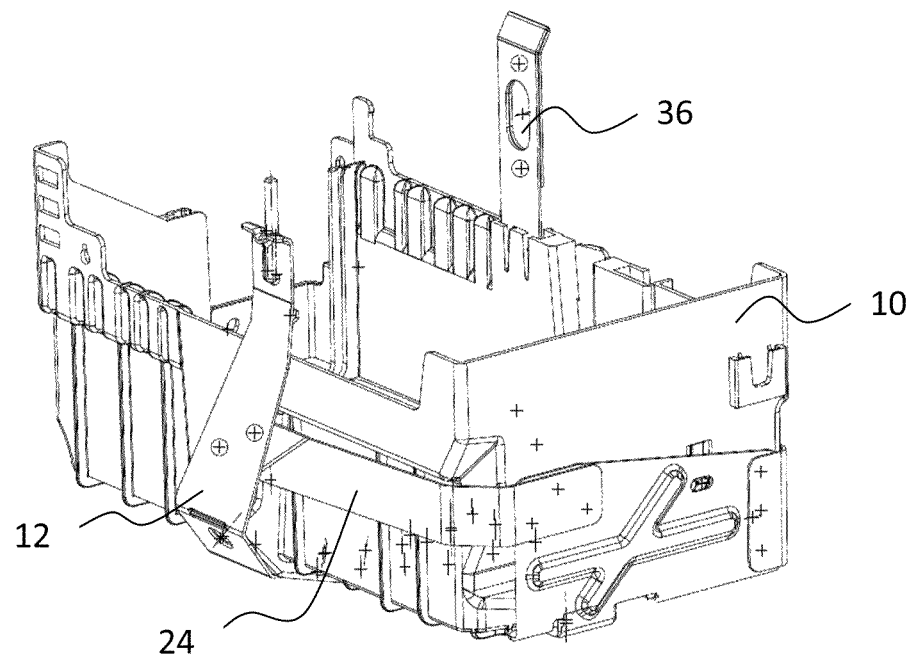
FIG. 4 shows a schematic illustration of a receptacle element according to an embodiment of the invention having a bracket element situated thereon.

To increase the stability of the retaining device, the bracket element 12 is fixed on the external surface of the receptacle element 10 via a plate 24, which is fastened on one side on the bracket element 12 and on the other side on the receptacle element 10. The plate 24 at least partially encompasses the receptacle element 10, as shown in FIG. 4.

A protective plate 28 is situated on the lateral surface 26 of the receptacle element 10 pointing in the travel direction, which is used for the purpose of reinforcing the receptacle element 10 in particular in this area, which is critical in the event of an accident, in that the forces acting on the receptacle element 10 during a frontal impact of the motor vehicle may be absorbed and damped by the protective plate 28, so that the battery is damaged as little as possible by the forces acting during a frontal impact. The protective plate 28 has a nose-shaped angled area 30, which at least partially covers the lateral face of the battery which is spanned by the fixing element 18. The nose-shaped angled area 30 is preferably situated at a right angle to the longitudinal side 32 of the protective plate 28.

As shown in FIG. 2, the bracket element 12 can be at least partially guided on the inner side of the receptacle element 10, whereby the stability of the receptacle element 10 can be increased.

Figure 3:
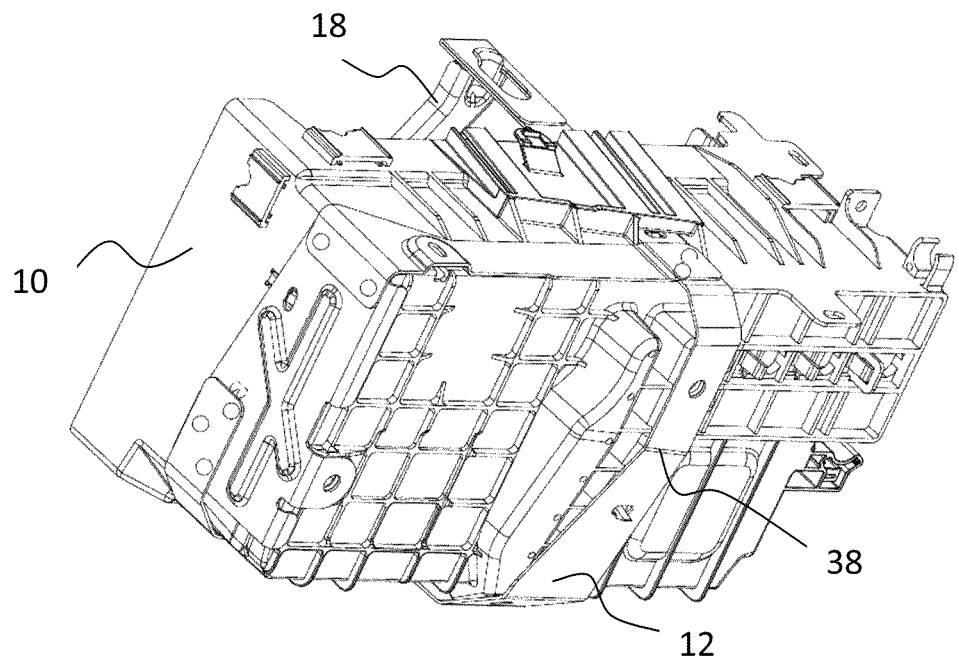
FIG. 3 shows a third perspective schematic illustration of the device according to an embodiment of the invention for retaining a battery in a motor vehicle.

FIG. 3 shows the retaining device in a bottom view, it being recognizable in this case that the bracket element 12 preferably has a bend 38 in the area where it spans the bottom surface 14 of the receptacle element 10. The two ends of the bracket element 12 are thus not directly opposite to one another, as recognizable in FIG. 1, but rather are situated offset to one another, whereby the stability of the bracket element and thus the entire retaining device can be significantly increased, because the forces acting on the retaining device in case of an accident may be compensated for better. In order to be able to connect the ends of the bracket element 12 situated offset to one another with one another, the fixing element 18 also has a bend 40, as recognizable in FIG. 1. The bend 38 of the bracket element 12 and the bend 40 of the fixing element 18 are situated at different positions parallel to the bottom surface 14 of the receptacle element 10, whereby the stability of the entire device is also increased. However, the bracket element 12 and the fixing element 18 may also be designed without a bend, but rather as linear.

FIG. 4 shows a further illustration of a receptacle element 10 according to an embodiment of the invention having a bracket element 12 situated thereon, the fixing element 18 not yet being situated on the retaining device in this case, so that the battery can be inserted into the receptacle element 10 and subsequently fixed using the fixing element 18.

Figure 5:
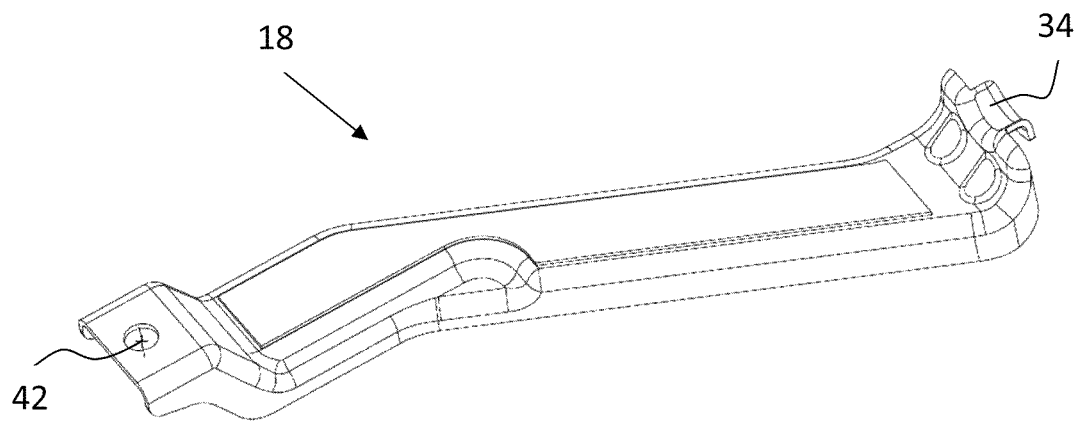
FIG. 5 shows a schematic illustration of a fixing element according to an embodiment of the invention.

FIG. 5 schematically shows a fixing element 18 according to an embodiment of the invention, which has an oblong strip-shaped form and has a hook on one end for fixing the fixing element 18 on the bracket element 12 using a clamp connection and has a through hole 42 on its other end for fixing the fixing element 18 on the bracket element using a screw connection.

Figure 6:
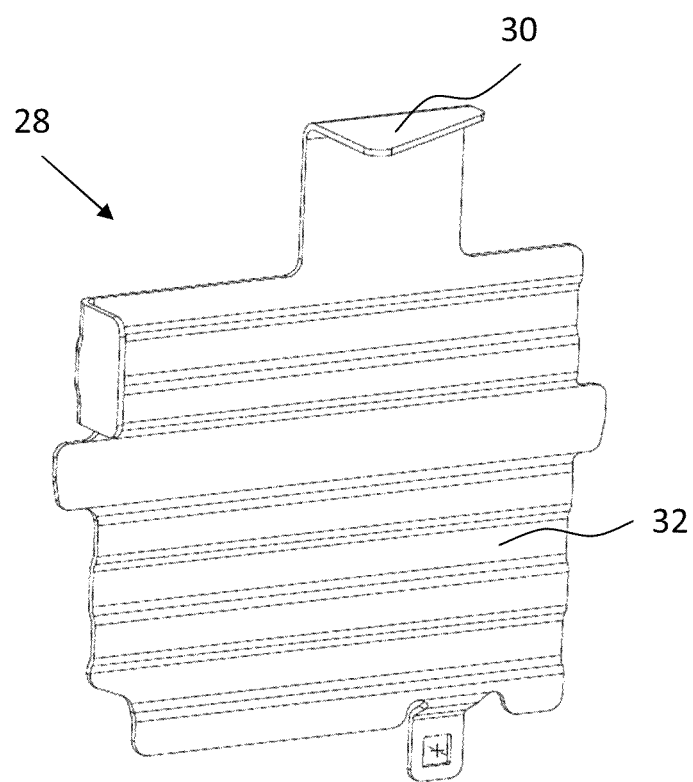
FIG. 6 shows a schematic illustration of a protective plate according to an embodiment of the invention.

FIG. 6 schematically shows a protective plate 28 according to an embodiment of the invention. The protective plate 28 preferably comprises a reinforced metal plate and preferably has a ribbed structure in the area of the longitudinal side 32 of the protective plate 28, whereby the protective plate 28 is implemented as particularly stable. The protective plate 28 has a nose-shaped angled area 30, preferably at a right angle to the longitudinal side 32 of the protective plate 28, which preferably does not have a ribbed structure.

To be able to achieve secure fixing of the battery in the receptacle element 10, the bracket element 12 and/or the protective plate 28 are preferably adaptable in their dimensions to the size of the particular battery inserted into the receptacle element 10.

Figure 7:
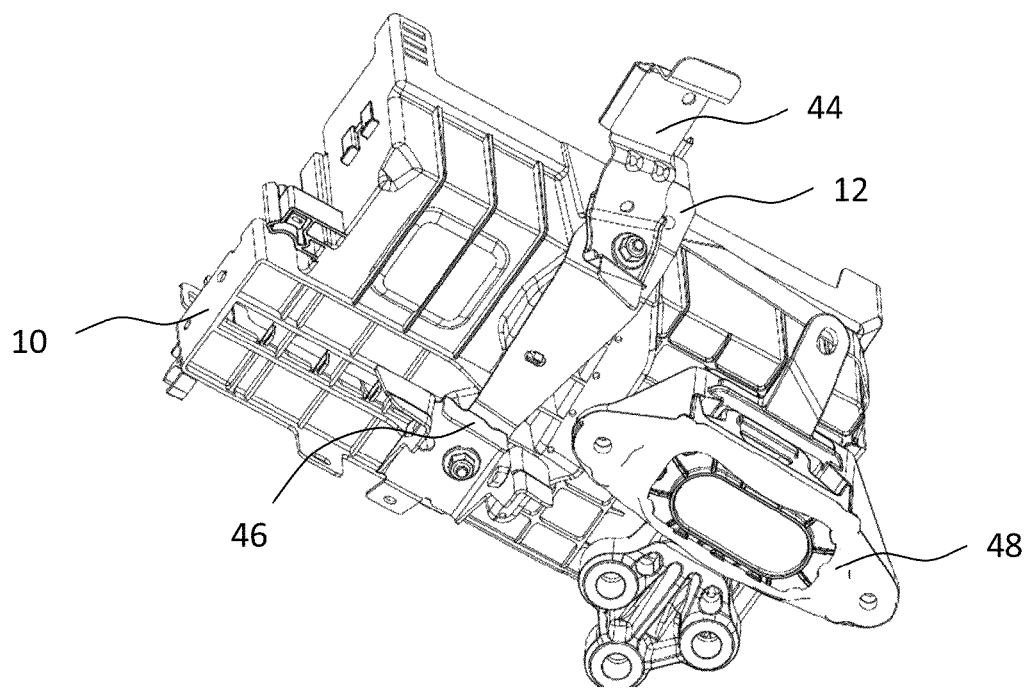
FIG. 7 shows a perspective schematic illustration of possible fixing of the device according to the an embodiment of invention in a motor vehicle.
Figure 8:
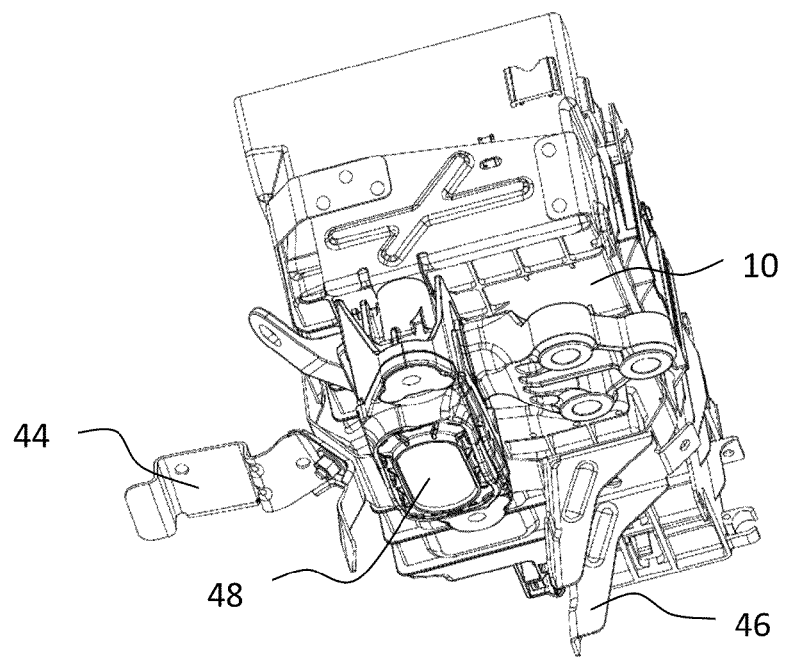
FIG. 8 shows a further perspective schematic illustration of possible fixing of the device according to an embodiment of the invention in a motor vehicle.

FIG. 7 and FIG. 8 schematically show a possible embodiment for fixing the device according to an embodiment of the invention for retaining a battery. The device is preferably fastened on the vehicle body of the vehicle on its bottom side oriented toward the roadway, the fastening being able to be performed via one or more fasteners 44, 46 is situated on the bracket element 12 and/or via one or more fasteners 48 situated on the receptacle element 10, as shown in FIG. 7 and FIG. 8.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A device for retaining a battery in a motor vehicle, comprising:
   a receptacle element adapted to receive the battery;
   a bracket element that at least partially encloses the receptacle element or the battery, wherein the bracket element comprises a bend in an area of the bracket element spanning a bottom surface of the receptacle element, causing a first end of the bracket element to be situated offset to a second end of the bracket element;
   a fixing element that is fastenable on the bracket element and adapted to fix the battery inside the receptacle element; and
   a protective plate, situated within one of a plurality of pairs of slots positioned on inner side walls of the receptacle element, and comprising a nose structure for fixation in the bottom area of the receptacle element, wherein the protective plate is configured to:
      accommodate a battery in a variety of sizes that is inserted into the receptacle element, based upon the one of the plurality of pairs of slots in which the protective plate is situated; and
      reinforce the receptacle element and at least partially absorb forces acting upon the receptacle element during a frontal impact of the motor vehicle.

2. The device according to claim 1, wherein the fixing element spans at least one lateral surface of the battery and the fixing element spans a lateral surface of the battery that is not at least partially covered by the receptacle element.

3. The device according to claim 1, wherein the fixing element at least partially comprises a rubber pad.

4. The device according to claim 1, wherein the fixing element is removably fastened on the bracket element using a screw connection.

5. The device according to claim 1, wherein the fixing element is removably fastened on the bracket element using a clamp connection.

6. The device according to claim 1, wherein the bracket element at least partially presses against two lateral surfaces of the battery to fix the battery in the receptacle element.

7. The device according to claim 1, wherein the protective plate comprises a nose-shaped angled area that at least partially covers the lateral surface of the battery that is spanned by the fixing element.

8. The device according to claim 1, wherein the receptacle element is produced at least partially from a plastic material.

9. The device according to claim 1, wherein the bracket element is produced at least partially from a metal.

10. A motor vehicle, comprising:
    a battery; and
    a device for retaining the battery, comprising:
       a receptacle element adapted to receive the battery;
       a bracket element that at least partially encloses the receptacle element or the battery, wherein the bracket element comprises a bend in an area of the bracket element spanning a bottom surface of the receptacle element, causing a first end of the bracket element to be situated offset to a second end of the bracket element;
       a fixing element that is fastenable on the bracket element and adapted to fix the battery inside the receptacle element; and
       a protective plate, situated within one of a plurality of pairs of slots positioned on inner side walls of the receptacle element, and comprising a nose structure for fixation in the bottom area of the receptacle element, wherein the protective plate is configured to:
       accommodate a battery in a variety of sizes that is inserted into the receptacle element, based upon the one of the plurality of pairs of slots in which the protective plate is situated; and
       reinforce the receptacle element and at least partially absorb forces acting upon the receptacle element during a frontal impact of the motor vehicle.

11. The motor vehicle according to claim 10, wherein the fixing element spans at least one lateral surface of the battery and the fixing element spans a lateral surface of the battery that is not at least partially covered by the receptacle element.

12. The motor vehicle according to claim 10, wherein the fixing element at least partially comprises a rubber pad.

13. The motor vehicle according to claim 10, wherein the fixing element is removably fastened on the bracket element using a screw connection.

14. The motor vehicle according to claim 10, wherein the fixing element is removably fastened on the bracket element using a clamp connection.

15. The motor vehicle according to claim 10, wherein the bracket element at least partially presses against two lateral surfaces of the battery to fix the battery in the receptacle element.

16. The motor vehicle according to claim 10, wherein the protective plate comprises a nose-shaped angled area that at least partially covers the lateral surface of the battery that is spanned by the fixing element.

17. The motor vehicle according to claim 10, wherein the receptacle element is produced at least partially from a plastic material.

18. The motor vehicle according to claim 10, wherein the bracket element is produced at least partially from a metal.

* * * * *